United States Patent
Kanazawa et al.

[19]

[11] Patent Number: 6,102,466
[45] Date of Patent: Aug. 15, 2000

[54] STRUCTURE OF VEHICLE BODY OF A VEHICLE

[75] Inventors: Yoshinobu Kanazawa; Kimitaka Andoh; Toshihiko Iwamori, all of Wako, Japan

[73] Assignee: Honda Giken Kogyo Kabushiki Kaisha, Tokyo, Japan

[21] Appl. No.: 09/001,657

[22] Filed: Dec. 31, 1997

[30] Foreign Application Priority Data

May 28, 1997 [JP] Japan .................................. 9-138914

[51] Int. Cl.$^7$ .............................. B60N 3/06; B62D 25/20
[52] U.S. Cl. ............................................................ 296/75
[58] Field of Search .............................. 296/75, 188, 189, 296/204

[56] References Cited

U.S. PATENT DOCUMENTS

| | | | |
|---|---|---|---|
| 652,066 | 6/1900 | White | 296/75 |
| 3,047,088 | 7/1962 | Murrell | 296/75 |
| 4,726,438 | 2/1988 | Stuertz et al. | 180/90.6 |
| 4,991,900 | 2/1991 | White | 296/75 |
| 5,562,329 | 10/1996 | Srock et al. | 296/188 X |
| 5,882,065 | 3/1999 | Koiwa et al. | 296/203.02 |

FOREIGN PATENT DOCUMENTS 0247176  10/1988  Japan ...................................... 296/204

OTHER PUBLICATIONS

"Vehicle Body of Automobile Vehicle", *Automobile Engineering Book*, vol. 13, pp. 20–23 (in the Japanese Language) (Date Unknown).

*Primary Examiner*—D. Glenn Dayoan
*Assistant Examiner*—Paul Chenevert
*Attorney, Agent, or Firm*—Arent Fox Kintner Plotkin & Kahn, PLLC

[57] ABSTRACT

A foot-rest support plate for a vehicle in which the support plate is separate from a dashboard and a floor panel. The support plate is comprised of a vertical plate portion contacting a rear surface of the dashboard, a rearward-declining plate portion connected to a lower end of the vertical plate portion which faces the bottom of the feet of an occupant, and a horizontal plate portion connected to a lower end of the declining plate portion and contacting an upper surface of the floor panel. The vertical plate portion is coupled to the dashboard, the horizontal plate portion is coupled to the floor panel, and the declining plate portion is not coupled to the vehicle body.

6 Claims, 3 Drawing Sheets

STRUCTURE OF VEHICLE BODY OF A VEHICLE

BACKGROUND OF THE INVENTION

1. Field of the Invention

The present invention relates to a structure of a vehicle body in an automobile vehicle, and in particular, to a structure around a lower portion of the dashboard.

2. Description of the Prior Art

The structure of a vehicle body of an automobile with longitudinally extending side-frames in front of the vehicle compartment which are coupled at their rear ends to a front surface of a dashboard, such as shown in FIG. 4, is conventionally widely known (see, for example, pages 20 to 23 etc., of "Vehicle body of Automobile Vehicle in Automobile Engineering Book, Vol. 13" issued from Sankaidou).

In the above-described vehicle, when a large collision load is applied from the front to the vehicle body upon collision or the like of the vehicle, a lower portion of the dashboard corresponding to the foot contact point of an occupant at a toe side may be deformed to protrude rearwards due to the deformation or rearward displacement of the side-frames, thereby pushing back the foot contact point. In such case, the foot-ankle joint of the occupant is subjected to a flexure load so that the angle θ of the joint (which will be simply referred to as a foot-ankle joint angle hereinafter) formed by the foot and the ankle is decreased.

A thick pad material may be mounted at the lower portion of the dashboard in order to inhibit the decrease of the foot-ankle joint angle. In this case, there is, however, a disadvantage in that the space around the feet of the occupant is reduced due to the use of the thick pad material. Also, the rigidity and strength of the dashboard and a portion around the dashboard may be specially increased using a reinforcing material in order to inhibit the decrease of the foot-ankle joint angle. However, the use of the reinforcing material causes disadvantages such as an increase in weight of the vehicle, a substantial increase in cost, a s substantial reduction in space around the feet of the occupant and the like.

SUMMARY OF THE INVENTION

The present invention has been accomplished with these circumstances in view, and it is an object of the present invention to provide a simple structure for a vehicle body of an automobile, wherein even if a portion of the dashboard against which the foot of the occupant contacts, is deformed to protrude rearwards due to the collision of the vehicle, the decrease in foot-ankle joint angle of the occupant in a front seat can be suppressed without use of a thick pad material or a reinforcing material, and the flexure load applied to the foot-ankle joint can be effectively alleviated.

To achieve the above object of the present invention, there is provided a structure for a vehicle body of an automobile, in which the side-frames of the vehicle body in the front of the vehicle compartment, are coupled at their rear ends to a front surface of the dashboard. The structure includes a foot-rest support plate which is separate from the dashboard and a floor panel. The foot-rest support plate comprises a vertical plate portion contacting a rear surface of the dashboard, a rearward-declining plate portion connected to a lower end of the vertical plate portion, facing the bottom of an occupant's feet, and a horizontal plate portion connected to a lower end of the declining plate portion and contacting an upper surface of the floor panel. The vertical plate portion is coupled to the dashboard, and the horizontal plate portion is coupled to the floor panel. The declining plate portion is not coupled to the vehicle body.

With this feature, even if a portion of the dashboard against which the foot of an occupant strikes is deformed to protrude rearwards due to the collision of the automobile or the like, an intermediate portion of the support plate, which is not in a coupled relation to the vehicle body, can be deformed in response to the deformation of the dashboard, so that it protrudes to expand toward the passenger compartment, thereby pushing the heel of the occupant rearwards (i.e., into a desired shape for the feet of the occupant). Therefore, even if a thick pad material or a reinforcing material is not used, the decrease of the foot-ankle joint angle of the occupant due to the deformation of the dashboard, is inhibited to the utmost.

The mode for carrying out the present invention will now be described in detail by way of an embodiment illustrated in the accompanying drawings.

DETAILED DESCRIPTION OF THE PREFERRED EMBODIMENTS

Figure 1:
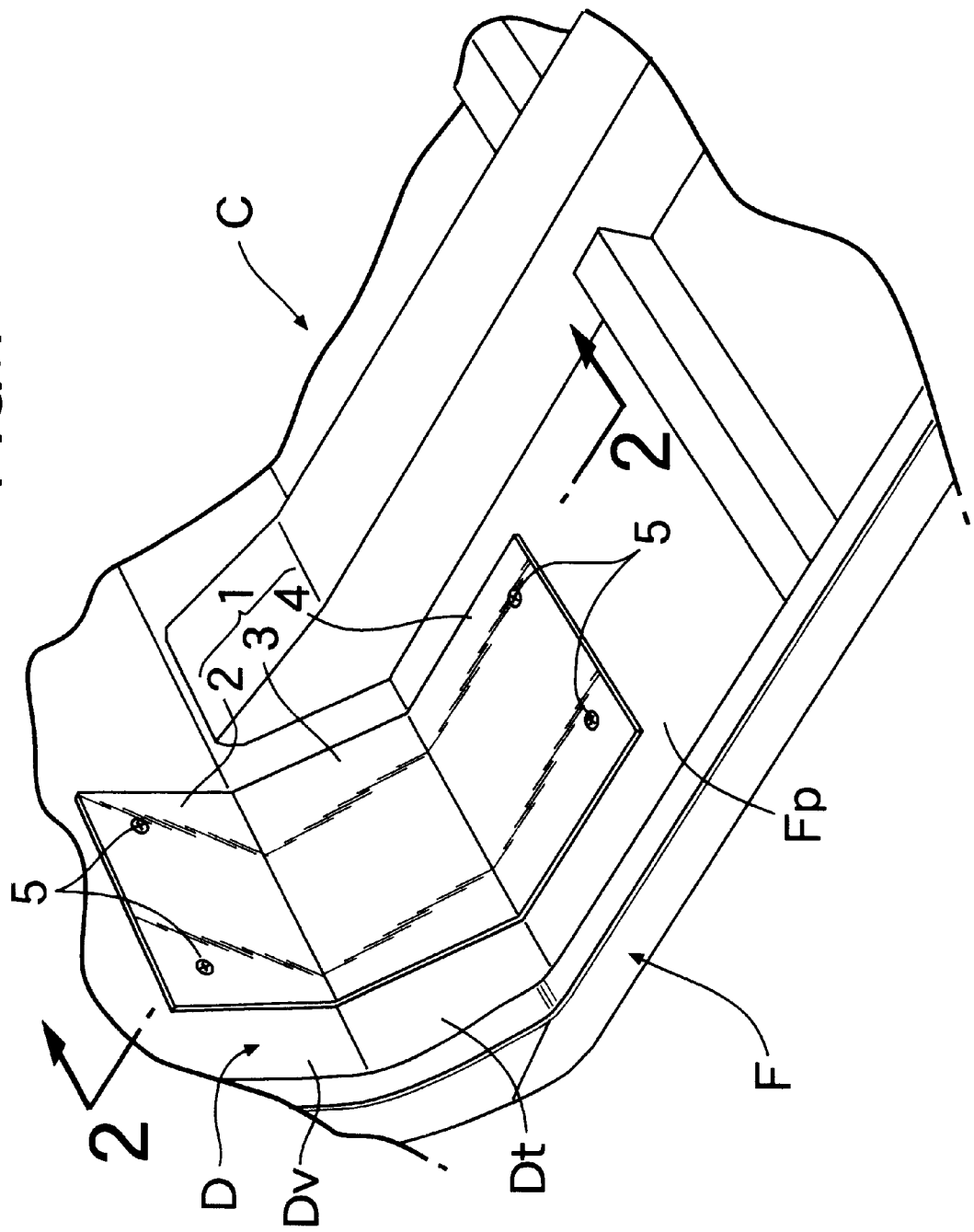
FIG. 1 is a perspective view of an area around the feet of an occupant in a vehicle compartment according to an embodiment of the present invention.
Figure 2:
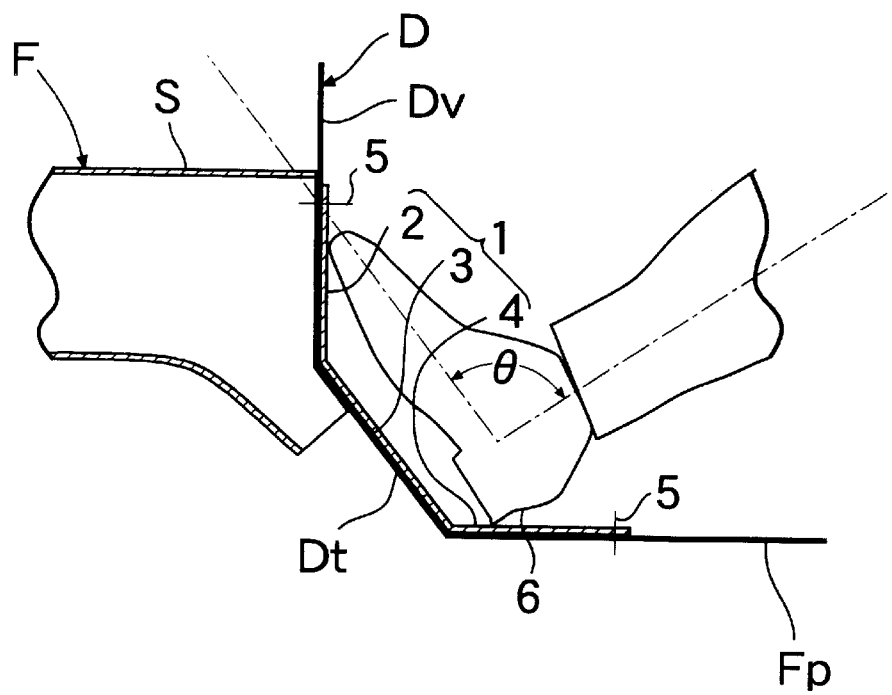
FIG. 2 is a sectional view taken along a line 2—2 in FIG. 1.

In FIGS. 1 and 2, a vehicle body F of a vehicle V is of a mono-cock structure made by assembling of a steel plate panel by welding. A portion of the vehicle body F in front of a vehicle compartment C is integrally provided with a pair of left and right side-frames S extending in a longitudinal direction on left and right opposite sides of the vehicle body portion F. Each of the left and right side-frames S is formed into a closed sectional structure to form a skeleton for a front portion of the vehicle body. Left and right opposite sides of a square subframe (not shown) for supporting an engine is supported at a plurality of points in a coupled manner, between the side-frames S.

A dashboard D forming a portion of the vehicle body F and forming a front end wall of the passenger compartment C, is positioned substantially vertically to separate the passenger compartment C and an engine compartment. A lower end of the dashboard D is declined rearwardly to form a toe board Dt corresponding to the feet of an occupant in the front seat, and a lower end edge of the dashboard D is integrally coupled to a front end of a floor panel Fp of the vehicle body F. Rear ends of the left and right side-frames S are integrally coupled to a front surface of the dashboard D at locations near its lower end, at a distance astride a substantially vertical portion Dv and an inclined lower end portion Dt of the dashboard D. The above-described structure is a conventional normal structure of a vehicle body.

A foot-rest support plate 1 made of sheet steel and formed separately from the dashboard D, is disposed behind the dashboard D on the side of the front passenger seat. The support plate 1 is comprised of a vertical plate portion 2 contacting a rear surface of the vertical portion Dv of the dashboard D, an inclined plate portion 3 connected to a lower end of the vertical plate portion 2 and declining rearwards, and a horizontal plate portion 4 connected to a lower end of the inclined plate portion 3 and contacting an upper surface of the floor panel Fp of the vehicle body F. A rear surface of the inclined plate portion 3 is a toe board surface faced by the bottom of the occupants foot, and an upper surface of the horizontal plate portion 4 is a heel-rest surface on which the heel of the occupant's foot is placed.

The vertical plate portion 2 is integrally coupled to the rear surface of the vertical portion Dv of the dashboard D through a suitable fixing means (e.g., a plurality of bolts 5 in the illustrated embodiment), and the horizontal plate portion 4 is integrally coupled to the upper surface of the floor panel Fp through a suitable fixing means (e.g., a plurality of bolts 5 in the illustrated embodiment). Further, the inclined plate portion 3 is not coupled to the vehicle body F.

The operation of the embodiment will be described below. In a usual service state of the automobile vehicle V, the foot-rest support plate 1 is in a state in which it protrudes minimally toward the compartment C, and the vertical plate portion 2, the inclined plate portion 3 and the horizontal plate portion 4 are superposed on the vertical portion Dv, the inclined lower end portion (the toe board portion Dt) and the floor panel Fp, respectively. Therefore, a wide space around the feet of the occupant in the front seat, is ensured despite the special provision of the support plate 1.

Figure 3:
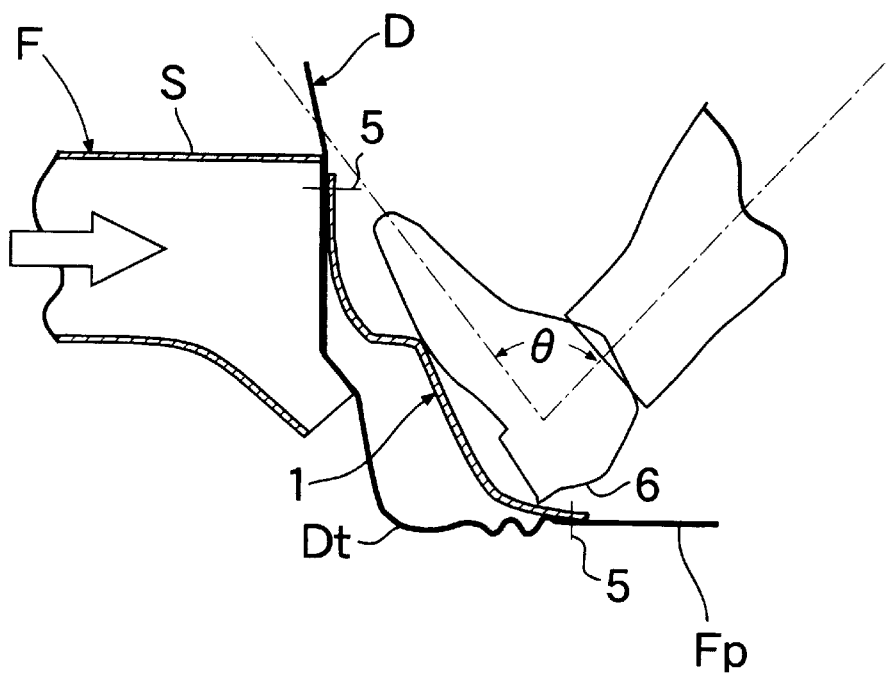
FIG. 3 is a sectional view similar to FIG. 2, but showing a deformed state upon collision of the vehicle.
Figure 4:
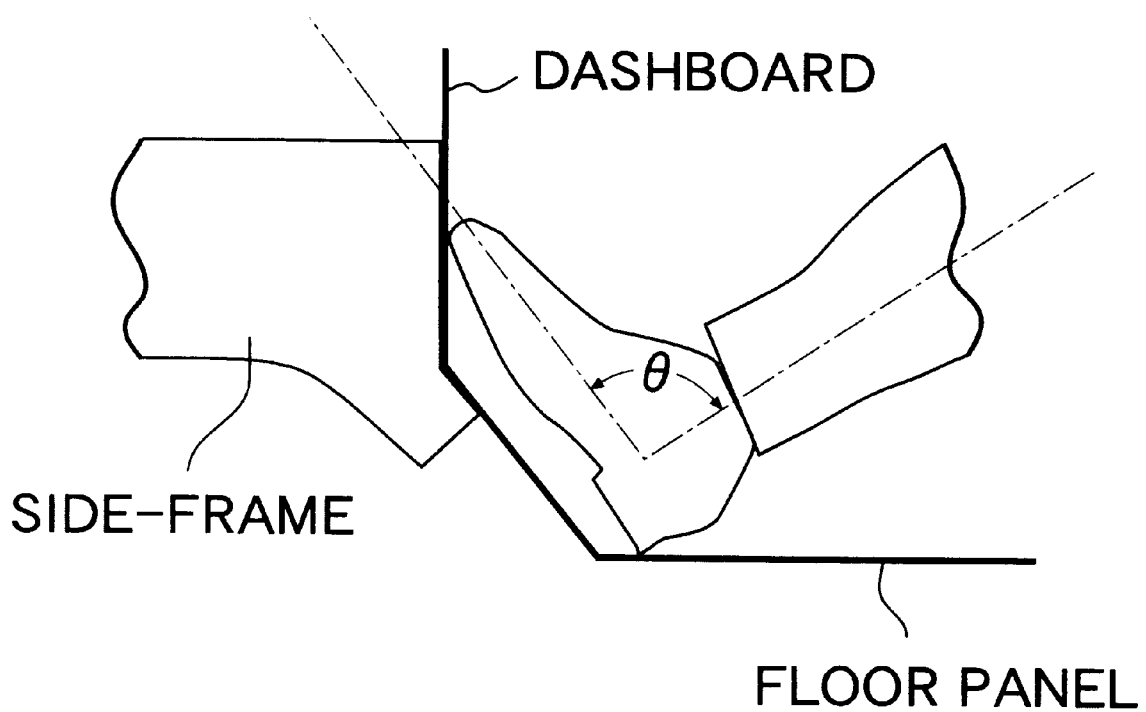
FIG. 4 is a vertical sectional view of a dashboard and its surrounding area in the prior art.

Upon collision of the vehicle V, the vertical portion Dv and the inclined lower end portion (the toe board portion Dt) of the dashboard D may be deformed in some cases due to the deformation or rearward displacement of the side-frames S, as described above, so that a portion thereof corresponding to a foot contact point protrudes rearwards, as shown in FIG. 3. In such a case, the foot-rest support plate 1 is deformed into a desired shape for the feet of the occupant, in response to the deformation of the dashboard D. In other words, the longitudinal direction between the junctions of the front and rear ends of the support plate 1 with the surface of the vehicle body (the dashboard D and the floor panel Fp), is reduced due to the deformation of the dashboard D. This causes the intermediate portion of the support plate 1 cut off from escape, to be deformed to expand toward the passenger compartment C, as shown in FIG. 3, thereby pushing the heel 6 of the occupant rearwards. As a result, even if a thick pad material or a reinforcing material is not used, a reduction in angle θ of the foot-ankle joint of the occupant with the deformation of the dashboard D, is inhibited, and the flexure load applied to the foot-ankle joint is effectively alleviated.

The entire back surfaces of the vertical plate portion 2, the inclined plate portion 3 and the horizontal plate portion 4 of the support plate 1 have been shown as being in close contact with the vertical portion Dv, the inclined lower end portion (toe board portion Dt) and the floor panel Fp of the dashboard D, respectively in the embodiment. However, according to the present invention, the plate portions 2, 3 and 4 may be placed, so that at least a portion of each of them is located above the surface of the vehicle body. In addition, the foot-rest support plate 1 has been shown as being mounted in the passenger's seat, but according to the present invention, the support plate 1 may be mounted on the side of a driver's seat.

As discussed above, according to the present invention, when the portion of the dashboard against which the occupant's foot rests is deformed to protrude rearwards due to the collision of the vehicle, the intermediate portion of the support plate can be deformed to protrude toward the passenger compartment in response to the deformation of the dashboard, thereby pushing the heel of the occupant rearwards (i.e., into a desired shape for the feet of the occupant). Therefore, the decrease of the foot-ankle joint angle of the occupant due to the deformation of the dashboard can be inhibited, and the flexure load applied to the foot-ankle joint can be effectively alleviated.

It is unnecessary to use a special thick pad material or a reinforcing material in order to inhibit the decrease of the foot-ankle joint angle and hence, the weight of the vehicle body and the cost can be correspondingly reduced, and a sufficient space around the feet of the occupant can be ensured.

Although the embodiment of the present invention has been described above, it will be understood that the present invention is not limited to the above-described embodiment, and various modifications and variants may be made within the scope of the present invention.

What is claimed is:

1. A foot-rest support plate used in a vehicle body of a vehicle having a dashboard provided with a rear surface, a vertical portion, and an inclined lower end portion, side-frames in front of a vehicle compartment, the side-frames coupled at rear ends thereof to a front surface of said dashboard, and a floor panel, the foot-rest support plate being an included component of the vehicle with said dashboard and said floor panel, said foot-rest support plate having a non-deformed state and a deformed state, wherein said foot-rest support plate changes from the non-deformed state to the deformed state due to a collision of the vehicle, said foot-rest support plate comprising:

a vertical plate portion that contacts the rear surface of said dashboard;

a rearward-declining plate portion connected to a lower end of said vertical plate portion, and adapted to face a bottom of a foot of an occupant of the vehicle which forms a foot-ankle joint angle; and a horizontal plate portion connected to a lower end of said rearward-declining plate portion and contacts an upper surface of said floor panel, said vertical plate portion being coupled to the vertical portion of said dashboard, said horizontal plate portion being coupled to said floor panel, and said rearward-declining plate portion contacts the inclined lower end portion of the dashboard when in said non-deformed state, wherein a portion of at least one of the vertical plate, the rearward-declining plate and horizontal plate portions is not in contact with the rear surface of the dashboard, the lower end of the vertical plate portion, and the upper surface of the floor panel, respectively, when the footrest support plate is in the deformed state.

2. The foot-rest support plate according to claim 1, wherein a longitudinal distance between a first contact point of said vertical plate portion and said rear surface of said dashboard and a second contact point of said horizontal plate portion and said floor panel reduces due to said collision of the vehicle.

3. The foot-rest support plate according to claim 2, wherein said rearward-declining plate portion deforms toward the vehicle compartment such that the bottom of the foot of the occupant is pushed rearward toward the vehicle compartment.

4. The foot-rest support plate according to claim 1, wherein a flexure load applied to the foot-ankle joint angle is alleviated when said foot-rest support plate is brought to said deformed state.

5. The foot-rest support plate according to claim 1, further comprising fixing means for fixing at least one of said vertical plate portion and said horizontal plate portion to said rear surface of said dashboard and said floor panel, respectively.

6. The foot-rest support plate according to claim 5, wherein said fixing mixing are a plurality of bolts.

* * * * *